United States Patent
Ward et al.

(10) Patent No.: US 10,992,480 B2
(45) Date of Patent: Apr. 27, 2021

(54) METHOD AND SYSTEM FOR PERFORMING A TRANSACTION AND FOR PERFORMING A VERIFICATION OF LEGITIMATE ACCESS TO, OR USE OF DIGITAL DATA

(71) Applicant: WARD PARTICIPATIONS B.V., Aerdenhout (NL)

(72) Inventors: Scott MacDonald Ward, Aerdenhout (NL); Teunis Tel, Groningen (NL)

(73) Assignee: WARD PARTICIPATIONS B.V., Aerdenhout (NL)

( * ) Notice: Subject to any disclaimer, the term of this patent is extended or adjusted under 35 U.S.C. 154(b) by 0 days.

(21) Appl. No.: 16/597,773

(22) Filed: Oct. 9, 2019

(65) Prior Publication Data

US 2020/0044865 A1    Feb. 6, 2020

Related U.S. Application Data

(63) Continuation of application No. 10/560,579, filed as application No. PCT/NL2004/000422 on Jun. 14, 2004.

(30) Foreign Application Priority Data

Jun. 13, 2003    (NL) .................. PCT/NL03/00436

(51) Int. Cl.
*H04L 9/32* (2006.01)

(52) U.S. Cl.
CPC .......... *H04L 9/3247* (2013.01); *H04L 9/3234* (2013.01); *H04L 2209/56* (2013.01)

(58) Field of Classification Search
CPC . H04L 9/3247; H04L 2209/56; H04L 9/3234; G06Q 20/3829; G06F 21/62–629
See application file for complete search history.

(56) References Cited

U.S. PATENT DOCUMENTS

| | | | |
|---|---|---|---|
| 5,354,097 | A | 10/1994 | Tel |
| 5,802,590 | A | 9/1998 | Draves |
| 5,892,900 | A | 4/1999 | Ginter et al. |
| 6,170,060 | B1 | 1/2001 | Mott et al. |
| 2001/0051996 | A1 | 12/2001 | Cooper et al. |
| 2002/0007456 | A1 | 1/2002 | Peinado et al. |
| 2002/0023215 | A1 | 2/2002 | Wang et al. |
| 2002/0095557 | A1 | 7/2002 | Constable et al. |
| 2002/0099666 | A1 | 7/2002 | Dryer et al. |
| 2002/0112162 | A1 | 8/2002 | Cocotis et al. |

(Continued)

FOREIGN PATENT DOCUMENTS

| | | |
|---|---|---|
| EP | 1076279 A1 | 2/2001 |
| EP | 1237324 A1 | 9/2002 |

(Continued)

OTHER PUBLICATIONS

Client Security Software Version 5.0 Installation Guide, IBM Client Security Solutions, First Edition (Sep. 2002), pp. 1-52.

(Continued)

*Primary Examiner* — Matthew T Henning
(74) *Attorney, Agent, or Firm* — Kenealy Vaidya LLP (57) ABSTRACT

A method for performing an electronic transaction is disclosed. The method provides authentication data and authentication software to an electronic device and preferably stored in a secure storage location or other location inaccessible to the user or the operating system of the device. The authentication software is activated to generate a digital signature from the authentication data. Next, the digital signature is provided to the other transaction party.

19 Claims, 7 Drawing Sheets

(56) References Cited

U.S. PATENT DOCUMENTS

| | | |
|---|---|---|
| 2002/0112171 A1 | 8/2002 | Ginter et al. |
| 2003/0039362 A1 | 2/2003 | Califano et al. |
| 2003/0041250 A1 | 2/2003 | Proudler |
| 2003/0046589 A1 | 3/2003 | Gregg |
| 2003/0061494 A1 | 3/2003 | Girard et al. |
| 2004/0083366 A1 | 4/2004 | Nachenberg et al. |
| 2007/0226806 A1* | 9/2007 | Tung ................ G06F 21/72 726/27 |

FOREIGN PATENT DOCUMENTS

| | | |
|---|---|---|
| GB | 2338381 A | 12/1999 |
| WO | WO2000067143 A2 | 11/2000 |
| WO | WO2001017296 A1 | 3/2001 |
| WO | WO2001046918 A2 | 6/2001 |
| WO | WO0184319 A1 | 11/2001 |
| WO | WO2002001334 A2 | 1/2002 |
| WO | WO0247081 A2 | 6/2002 |
| WO | WO2002076127 A1 | 9/2002 |
| WO | WO2004015579 A1 | 2/2004 |

OTHER PUBLICATIONS

IBM Improves PC Security System, IBM News room—Oct. 4, 2002, pp. 1-2.

IBM Client Security Solutions, "Embedded Security Chip and Software—a white paper", 1999, pp. 1-6.

IBM Client Security Solutions. Client Security Software Version 1.0 Administrator's Guide, First Edition (Dec. 1999), pp. 1-53.

An extract from IBM's "News Release" website, IBM News room—News release tinder result—Year: 2002, Month: October—United States, p. 1.

Bennet Yee:"Using Secure Coprocessors" Thesis Submitted to the School of Computer Science for the Degree of Doctor of Philosophy, XX, XX, May 1994 (May 1994), page Complete, XP002120312 the whole document.

International Search Report dated Jan. 25, 2005.

European Search Report dated Apr. 22, 2008.

"BIOS Boot Specification, Compaq Computer Corporation," Phoenix Technologies Ltd., Intel Corporation, Version 1.01, Jan. 11, 1996, pp. 1-46.

"Phoenix Technologies and Orbid Corporation Partner in Development of Secure Digital Rights Management Solution," Phoenix Technologies, 2003, 2 pages.

"What Is The BIOS?," Computing Basics, vol. 5 Issue 7, Jul. 1994, 8 pages.

"Federal Communications Commission Radio Frequency Interference Statement," Technical Reference, IBM Personal Computer XT Hardware Reference Library, 1983, 215 pages.

B. Yee, "Using Secure Coprocessors," School of Computer Science, Carnegie Mellon University, May 1994, 104 pages.

G. J .Popek et al, "Encryption and Secure Computer Networks," Computing Surveys, vol. 11, No. 4, Dec. 1979, pp. 331- 356.

\* cited by examiner

METHOD AND SYSTEM FOR PERFORMING A TRANSACTION AND FOR PERFORMING A VERIFICATION OF LEGITIMATE ACCESS TO, OR USE OF DIGITAL DATA

The present invention relates to a method and system for performing an electronic transaction and for performing a verification of legitimate access to, or use of digital data.

At present, numerous transactions are being handled by electronic means in digital format. Digital networks have evolved which enable parties of different kind across the world to communicate with each other and to exchange data and information to reach desired transactions.

The data and information exchanged in said transactions may be legally privileged or protected by copyright, for example. However, digital information may be very easily copied and spread without a trace of who illegally copied and spread the data.

Further, in particular in transactions involving private network access, financial commitments, settlements and/or payments, each party involved in such a transaction wants to identify any other party, or at least, to be able to track any other party, if after completion of the transaction a problem arises. For such identification purposes, it is known to use personal identifiers, such as passwords, Personal Identification Numbers (PIN), and the like, which are only known to a specific user. However, using personal identifiers over public networks like the Internet, there is a possibility that the personal identifier becomes known to another person, enabling this other person to do transactions or gain access to digital data presenting himself as somebody else. If a problem arises after completion of the transaction, it is not possible to track the real transaction partner, as its personal identifier may have been used by a malicious user of the public network.

For a more secure transaction, it has been proposed in European Patent Application No. 1 219 088 to use a trusted third party transaction server comprising profiles of the transaction parties. The transaction server verifies the identity of the transaction parties by using authentication data comprising a table of random data for verifying a digital signature. The digital signature is generated from a random token using a token reader. The table of random data corresponds to data collected from said random token. Thus, a digital signature originating from the random token and being different for every subsequent transaction is virtually impossible to forge and therefore uniquely identifies the transaction party.

A disadvantage of this system and other systems employing additional hardware is that the additional hardware, e.g. a token and a token reader, should be supplied to every possible transaction party.

It is therefore an object of the present invention to provide a method and system for performing an electronic transaction or electronic verification or identification without requiring additional hardware.

At least this object is achieved in the present invention by a method for performing an electronic transaction between a first transaction party and a second transaction party using an electronic device operated by the first transaction party. The method comprises providing authentication data in a memory of said electronic device, which authentication data are inaccessible to a user of the electronic device; providing authentication software in said electronic device, the authentication data being accessible to said authentication software; activating the authentication software to generate a digital signature from the authentication data; providing the digital signature to the second transaction party. In a preferred embodiment, the second transaction party provides digital data to the first transaction party.

In a further aspect, the present invention provides a method for performing a verification of legitimate use of digital data on an electronic device. The method comprises providing authentication data in a memory of said electronic device which authentication data are inaccessible to a user of the electronic device; providing authentication software in said electronic device, the authentication data being accessible to said authentication software; activating the authentication software to generate a digital signature from the authentication data; providing the digital signature to an application which accesses digital data having a digital signature embedded therein; and comparing the digital signature embedded in the digital data with the provided digital signature.

In another aspect, the present invention provides a method for encrypting digital data on an electronic device using an encryption key, the method comprising gathering session specific data; hashing said session specific data to obtain reference numbers referring to positions in an authorization table stored in said electronic device; generating said encryption key from the characters stored in the authorization table at said positions; and encrypting said digital data using said encryption key.

In a further aspect, the present invention provides systems for performing said methods.

Without use of any additional hardware, a transaction party in an electronic transaction may be identified with virtually no possibility for fraudulent use of the method. In a private network access transaction, the first transaction party is uniquely identifiable by its digital signature. Said digital signature is provided to the second transaction party that may store the digital signature. If a problem arises later, the first transaction party may be traced and identified by the digital signature provided to the second transaction party.

If digital data are provided to the first transaction party, e.g. copyright protected files such as music and the like, that are digitally signed according to the present invention, i.e. a digital signature is embedded in the digital data, said digital data may be traced, if they are later found to be illegally copied or spread. The embedded digital signature is uniquely traceable to the original first transaction party that received said digitally signed digital data.

Digital data digitally signed according to the present invention are stored in a storage medium of a device having the authentication software installed. The signature has been generated in accordance with the authentication data stored in said device and thereafter embedded in the digital data to protect the data and to be able to trace a malicious user.

The signature embedded in the data may also be employed to prevent that the data are illegally used, since the signature may be regenerated by the device at any time. As a regenerated signature should be identical to the one embedded in the digital data, a comparison of the embedded signature with the regenerated signature provides information whether the digital data is rightfully installed on the device. If the comparison shows that the signatures are identical, the data may be accessed by the device, and, for example, an application comprised in said digital data may be run or said digital data may be accessed by any other application, for example for playing music represented by said digital data. When the signatures are not identical, the digital data are illegally installed, e.g. copied from another device, and they may not be accessed and read by the device and an error signal may be generated.

Further aspects and features of the present invention are disclosed in the dependent claims.

The invention and its aspects, features, and advantages will be more readily appreciated as the same becomes better understood by reference to the following detailed description and considered in connection with the accompanying drawings provided by way of non-limiting examples, in which drawings like reference symbols designate like actions or parts.

Referring to FIGS. 1, 2, 4 and 6-9, in the methods illustrated in the respective Figures actions of different actors are shown in a number of columns. In the vertical direction, actions of the actors have been arranged in an essentially chronological order from top to bottom. Thus, actions described in one row of a chart essentially are performed prior to actions in a subsequent (lower) row of the chart, although this may not always be necessary, as indicated in some instances. The arrows in the Figures indicate a flow of data, which may be transferred through a suitable connection, such as a hard-wired connection, or a wireless connection, or a combination thereof, using an appropriate protocol in a network connection.

In this context, an installation method is to be understood as a method for installing software at some actors involved in the present method for enabling tracking and tracing of at least one transaction party. Further in this context, a new device relates to any electronic device containing a Basic In Out System ("BIOS", "Boot agent" etc.) with any associated secure storage/memory location, e.g. a computer, server, printer, personal digital assistant, mobile telephone, which is being manufactured, or has been manufactured, but has not yet been delivered to an end-user, whereas an existing device relates to any electronic device containing a Basic In Out System which has been delivered to an end-user, and may or may not have been used by the end-user. The Basic In Out System is only referred to as a system for accessing a memory location in a memory that is directly or indirectly connected to the electronic device. However, as is described hereinafter, the method according to the present invention may employ such a BIOS system to securely store certain digital data and/or such a BIOS system may be provided with an encryption system. A secure storage location and/or an encryption system are not essential to the BIOS system with respect to the present invention.

Figure 1:
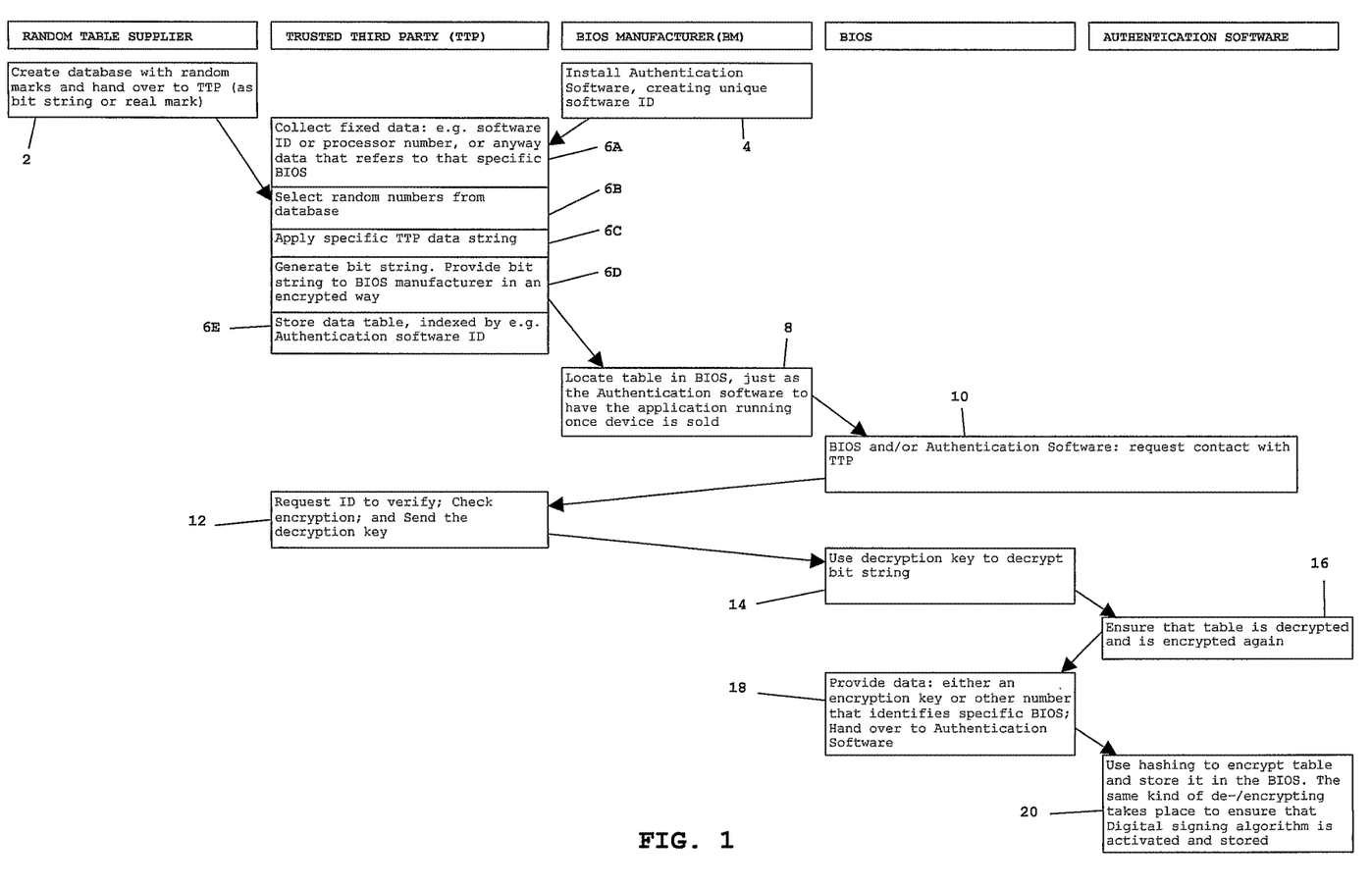
FIG. 1 illustrates a chart of an installation method for a new device according to the present invention.

FIG. 1 illustrates a first preferred embodiment of the present invention. Referring to FIG. 1, an installation method for a new device is illustrated. The method of FIG. 1 includes five actors: a random table supplier, a trusted third party, a BIOS manufacturer, a BIOS and authentication software. The first, second and third actors are physical entities, e.g. persons or companies, whereas the fourth and fifth actors are software embedded in a device.

In the first column of FIG. 1 actions of the random table supplier are shown. This supplier generates and supplies a random table or, essentially, random data to another actor.

A random table is defined as a table comprising random numbers. Such a table may be created by suitable software as such. Alternatively, U.S. Pat. No. 5,354,097 discloses another method of producing random numbers by optically scanning a randomly shaped material, such as a non-woven material. Likewise, a two-dimensional pattern may be used, which pattern has been formed by transformation of a bit string as disclosed in European Patent Application No. 1,219,088. From data collected during the reading of the randomly shaped material or pattern, random numbers can be derived, e.g. by using a predetermined algorithm.

The second column of FIG. 1 relates to actions of a trusted third party (TTP), which may be selected by the random table supplier, a BIOS manufacturer and/or the owner of any application or service. The TTP generates a bit string from the random table and other data, to be elucidated below. Further, the TTP stores the bit string and other data used to generate it. The generated bit string is sent to the BIOS manufacturer.

It is noted that in another embodiment of the present invention, the bit string may be generated and stored by another actor than the TTP. For example, in case of network access identification, the network administrator and/or a network server may generate and store the bit string such that when a user attempts to access the private network, the network administrator or server may regenerate the digital signature of said user. Thus, the user may unambiguously be identified by the network administrator or server before the user is granted access to the network.

The actions of the BIOS manufacturer are represented in the third column of FIG. 1. The BIOS manufacturer installs authentication software in a BIOS and stores the bit string supplied by the TTP in the BIOS.

The BIOS which is supplied by the BIOS manufacturer, is also an actor in the method, and its actions are represented by the fourth column of FIG. 1. The BIOS may be coupled to the TTP to receive a decryption code and enable the authentication software to decrypt an authentication table, which will then be encoded again and stored in a secure part of the device, only accessible to the BIOS.

The fifth column of FIG. 1 represents the actions of the authentication software, which may be supplied by the random table supplier or by any other third party and is stored in the BIOS. The authentication software may be coupled to the TTP to decrypt the bit string in the BIOS into an authentication table, encrypts the authentication table again and stores it in the secure part of the device, only accessible to the BIOS. Further, the authentication software stores and activates a digital-signing algorithm to generate a session- or transaction-specific digital signature. The authentication software preferably runs in a separate operating environment in the BIOS or in a console and is independent from and inaccessible to the operating system (OS) on the device.

As indicated in FIG. 1, the installation method for a new device for use with the tracking and tracing method according to the present invention starts with the generation of a random table, e.g. a table comprising randomly chosen characters or numbers, according to cell 2. The numbers may be generated using software employing an algorithm. Alternatively, as disclosed in U.S. Pat. No. 5,354,097, random numbers may be deduced from a randomly shaped material, such as a non-woven material. For example, in a non-woven material, fibers are arranged in a random order due to the randomness of the production process. From the geometry of the fibers of the non-woven material numbers may be calculated. For example, a number that may be calculated, may be the angle between two fibers in an area of the material, or the number of fibers crossing an imaginary line. The calculated numbers will be random, as the geometry of the material is random. Another alternative manner, as disclosed in European Patent Application No. 1,219,088, to collect random numbers is by transforming a bit string into a two-dimensional pattern using an algorithm. As described above from this two-dimensional pattern a table of random numbers may be calculated based on the geometry of the pattern.

The random table supplier may generate the random table and supply it to the TTP. Alternatively, the random table supplier may only supply a piece of non-woven material or software to generate two dimensional patterns according to European Patent Application No. 1,219,088, from which the TTP may then generate one or more random tables.

According to cell 4, a BIOS manufacturer embeds or installs authentication software in the BIOS. The authentication software may be supplied by the random table supplier, generated by the BIOS manufacturer or supplied by a third party.

The authentication software preferably has its own unique serial number, software ID and/or private encryption key. Said unique number may be advantageously employed in the installation method and in a track and trace method, as explained below.

Further, according to cells 6A-6E, the TTP generates a unique bit string, in the following way. First, according to cell 6A, the TTP collects fixed data, such as a unique serial number from a hardware device, a processor for example, or the unique software ID embedded in the authentication software in the previous step.

Preferably, the fixed data refer to a number or other character string stored in or related to the specific BIOS. The bit string, which will be generated from the fixed data, among others, is preferred to have a strong relation with the BIOS in which it is stored. Such a strong relation makes forging the bit string difficult.

In the next step 6B, the TTP selects a random table previously received from the random table supplier, or it generates a random table using a marker, such as a piece of non-woven material or using a random two dimensional pattern.

The TTP further generates a data string according to cell 6C. The three data sets, e.g. the fixed data, the random table and the data string, are used to generate a bit string using a predetermined algorithm according to cell 6D. The bit string is stored in a database according to cell 6E together with the fixed data and the data string, which were used to generate it.

The bit string is supplied to the BIOS manufacturer, preferably in an encrypted way. The BIOS manufacturer embeds the bit string, like the authentication software, in the BIOS according to cell 8. At this point, a computer may be assembled having a BIOS which comprises authentication software and a bit string. Thereafter, the computer may be sold, installed and connected to a network, such as the Internet.

At the first start-up of the computer according to cell 10 the BIOS or the authentication software uses a connection to a network, such as the Internet, to establish a connection with the TTP. The connection is being made to collect the data string, which is needed to decrypt the bit string and generate an authentication table. The BIOS or the authentication software may be identified by the TTP using the fixed data, which is a unique number as mentioned above.

The connection with the TTP does not need to be initiated by the BIOS, but may also be initiated by the authentication software, which is embedded in a secure part of the BIOS, or by a third party application. The connection preferably is made without a possibility for a user or the operating system of the computer to interrupt the procedure.

When a connection with the TTP is established, the BIOS or authentication software sends its identification number upon request of the TTP according to cell 12. The TTP returns, possibly upon request of the BIOS, the decrypt key, and the authentication software uses the decrypt key according to cell 14 to generate an authentication table from the bit string which was embedded in the BIOS according to cell 8.

Next, according to cell 16, the authentication table is encoded by the authentication software to prevent that the authentication table may be uncovered (e.g. by a person). Uncovering of the authentication table would weaken the protection conferred by the method and should therefore be virtually impossible.

The encoding is performed using a number, which is specific for the BIOS. When the authentication table is needed later, it may then be decoded by the authentication software using that BIOS-specific number. The BIOS-specific number may be a unique serial number or any ordinary encryption key incorporated in or generated by the BIOS, for example. The BIOS-specific number is sent to the authentication software according to cell 18 after a request from the authentication software according to cell 16.

The installation in a new device is completed according to cell 20. The encoded authentication table is stored in a secure part of the BIOS, where it may only be retrieved by the BIOS and not by the operating system. This secure part of the BIOS may also be any other, secure location in the device. For instance, it may be a separate part of a hard drive of a computer, which part may not be accessible to the operating system, but only to the BIOS and/or authentication software. Storing the authentication table in a secure location further decreases the possibility of retrieval of the authentication table.

The device is now set-up. Authentication software and an encoded authentication table are installed in the BIOS. Further, in a database of a trusted third party (TTP), data are stored which enable the TTP to generate the same authentication table when later needed.

Figure 2:
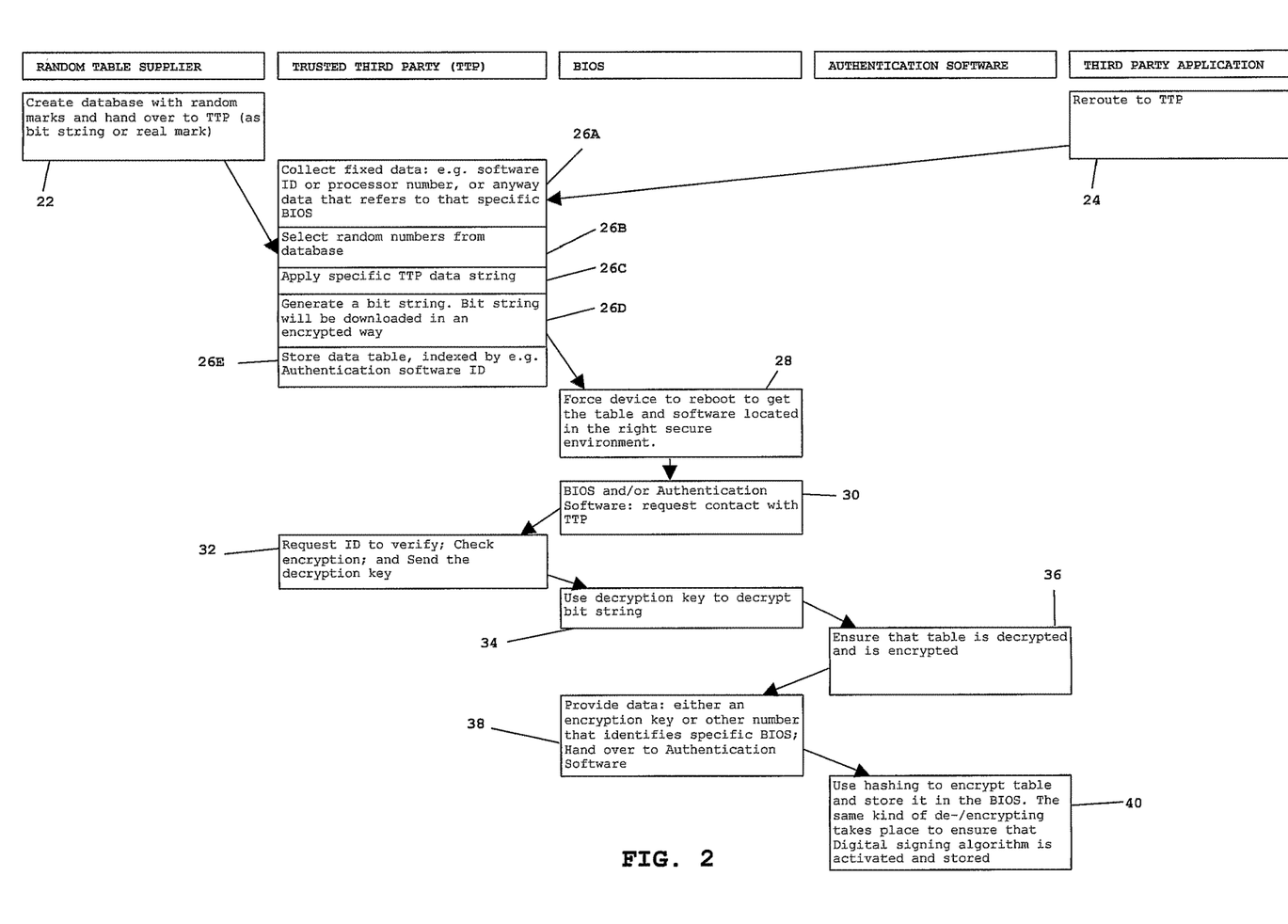
FIG. 2 illustrates a chart of an installation method for an existing device according to the present invention.

FIG. 2 illustrates a second preferred embodiment. In the second preferred embodiment, the installation method is performed on an existing computer device. The existing device does not have authentication software installed in its BIOS, nor does it have an encrypted bit string stored in its BIOS at the time a digital signature according to the present invention is needed for any track and trace purpose, including a particular electronic session, e.g. a network access procedure, or an on-line transaction. Thus, compared to a new computer device, further steps are necessary in the above-described installation method to install the necessary software and authentication table in a secure memory location of the device. Such a secure memory location may be a part of a secure memory or it may be an encrypted part of a non-secure memory, such as a user-accessible memory.

In FIG. 2, there are five columns representing five actors: a random table supplier, a TTP, a BIOS, authentication software and a third party application. Compared to FIG. 1 the BIOS manufacturer is no actor in the installation method for an existing device, but a third party application is introduced as an actor. The third party application is an on-line application, usually intended to do on-line logical access, or on-line transactions. The third party application requests a digital signature from the existing device, which does not have the authentication software and the authentication table. The third party application therefore requests that the device installs the authentication software first before continuing the transaction.

According to cell 22, the random table supplier generates and supplies a random table, similar to the action according to cell 2 in FIG. 1.

According to cell 24, a device having a BIOS without an authentication table and/or authentication software initiates an on-line transaction with a third party application. The third party application, however, requires an authentication according to the present invention. Therefore, the third party application redirects the requesting device to the TTP to obtain the authentication software and an authentication table.

The TTP generates and stores a bit string according to cells 26A-26E, similar to cells 6A-6E of FIG. 1. According to cell 26A the TTP collects fixed data, according to cell 26B a random table or a random marker is selected, and according to cell 26C the TTP selects a data string. From these three data sets, the TTP generates a bit string according to cell 26D and stores the bit string, the fixed data and the data string according to cell 26E. Further, the bit string is sent to the requesting device together with the authentication software, both encrypted.

The authentication software and the bit string are put in a part of the BIOS which is accessible to the operating system according to cell 28A. Next, according to cell 28B, the device needs to reboot to store the authentication software and the bit string in a secure part of the BIOS which is not accessible for the operating system.

At this point, the method continues as the method illustrated in FIG. 1 from cell 10 and further. According to cell 30 the device having newly stored authentication software and a bit string in its BIOS contacts the TTP again and requests a decrypt key, for example the data string, according to cell 32.

According to cell 34, the decrypt key is used to decrypt the authentication software and to decrypt the bit string and generate the corresponding authentication table. Next, according to cell 36, the authentication software verifies the authentication table and requests BIOS-specific data from the BIOS to encrypt the authentication table again.

According to cell 38 the BIOS sends BIOS-specific data, for example any common encryption key, to the authentication software in reply. The method is completed according to cell 40, wherein the authentication table is encrypted and stored in a secure part of the BIOS. Any data remaining in the operating system from the transfer of the authentication data and authentication software is deleted by the BIOS.

Using this installation method every device having a BIOS and capable of communicating with external, third party applications may have the authentication software and an authentication table installed, for example a personal computer, a cellular phone, a hand-held personal digital assistant with wireless communication capabilities or any other device containing a BIOS, as mentioned above.

When the software and the table are correctly installed in the BIOS, particular sessions, track and trace or on-line transactions may be initiated and performed using the authentication and digital signing method.

Figure 3:
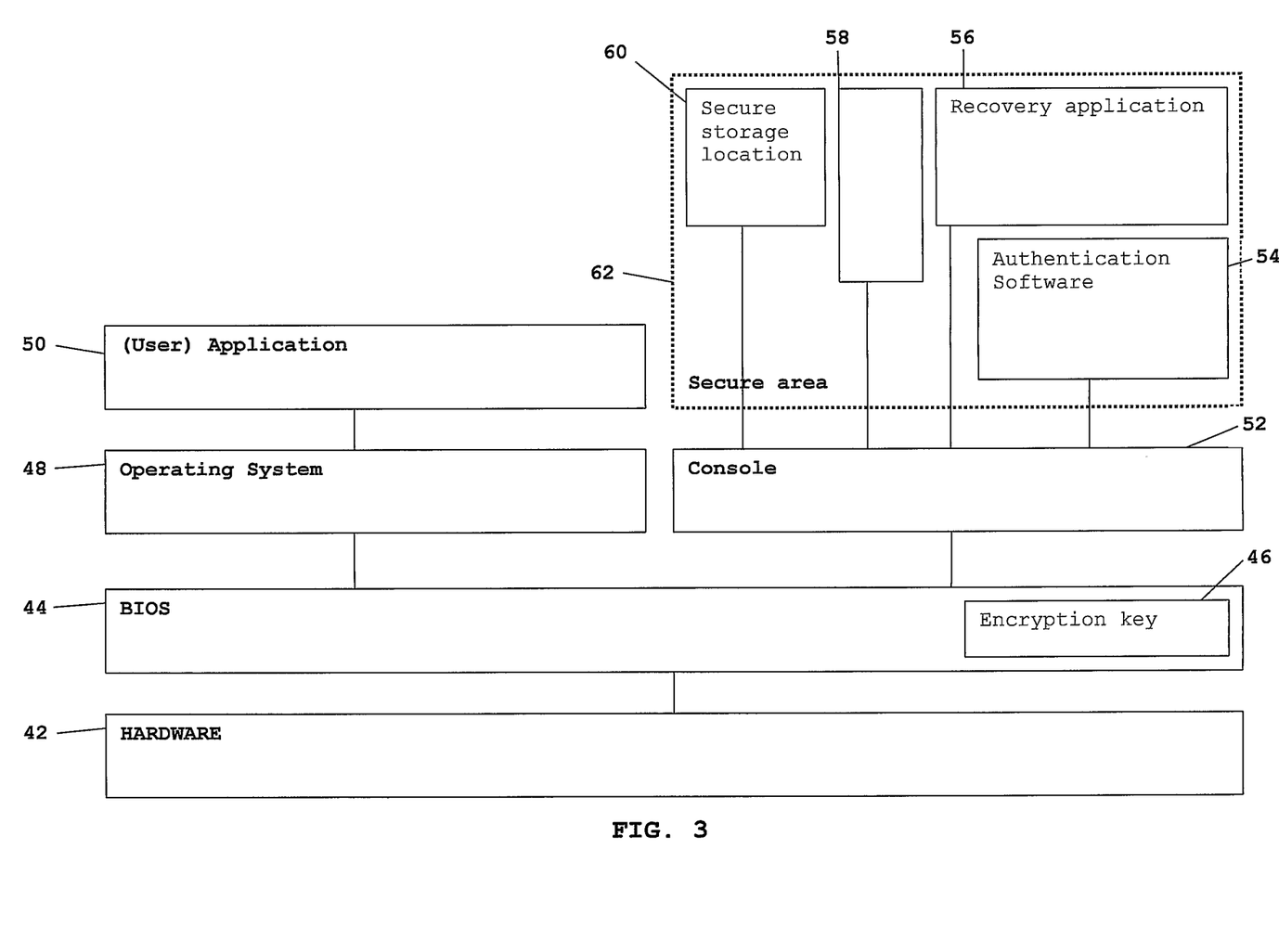
FIG. 3 schematically illustrates a computer configuration having authentication software and an authentication table installed in the BIOS according to the present invention.

FIG. 3 schematically illustrates a possible configuration of a device having the authentication software and an authentication table installed. The device consists of several components, commonly referred to as hardware 42. Exemplary hardware components are a processor, a hard drive, or other memory and a keyboard.

All the hardware devices are controlled by the BIOS 44. The BIOS 44 is a software package stored in a read-only memory (ROM), usually located on a main board, which is one of the hardware components of an electronic device.

The BIOS 44 controls most of the instructions and data flowing from one component to another. Data or instructions coming from one component and addressed to another need to pass through the BIOS 44. The BIOS 44 may check whether the instructions to the other component are allowed or not, as not every component is accessible for any other component.

The BIOS 44 may comprise an encryption key 46. Such an encryption key 46 may be used to encrypt data and only another party who knows the encryption key 46 may be able to decrypt the data.

The operating system 48 creates a run-time environment for any user applications. Therefore, it may be stated that the operating system 48 is an interface between a user and the hardware 42. A user may instruct the operating system 48 to run an application 50. If the application 50 needs data that are stored on the hard drive, the application 50 requests the data from the operating system 48. The operating system 48 in turn requests the data through the BIOS 44 from the hardware 42, i.e. the hard drive. The data coming from the hardware 42 pass through the BIOS 44 and the operating system 48 before they arrive at the requesting application 50. Via this protocol the BIOS 44 may control the accessibility of certain data or hardware devices 42 and thus the use of particular software. It may prohibit, for example, the operating system 48 to access certain parts of a hard drive or start certain applications.

A console 52 is an environment, which runs all the processes in the computer without user interruption. The console 52 plays an important role at start-up of the computer, instructing the hardware devices 42 via the BIOS 44 to start and report their status. In case of errors, not only at start-up but also during operation, the BIOS 44 sends the error messages coming from the hardware 42 to the console 52. The console 52 then handles and corrects the errors. Thus, the console 52 runs more or less stand-alone the computer. A user may not interrupt or influence the console 52. Any instructions coming from the operating system 48 intended for the console 52 may therefore be blocked by the BIOS 44.

In or behind the console 52, there is a secure area 62 only accessible to the BIOS. The secure area 62 comprises applications and storage locations, which are not reported to the operating system 48. That means that the operating system 48 does not know that the applications and data in the storage locations are present and maybe even running in a separate environment. For example, when a hardware device 42 reports an error, the console 52 may run a recovery application 56 to handle the error such that the hardware device 42 recovers from the error and is able to continue its operation. The operating system 48 has probably not even noticed that there was an error.

An authentication table may be securely stored in the secure storage location 60. In such a part of the computer, commonly seen as a part of the BIOS 44, the authentication table is unreachable for the operating system 48 and thus for a user.

With the authentication table securely stored in the secure storage location 60, the authentication software 54 should run in an environment in the BIOS 44, thus preventing that the authentication table is accessible to the operating system 48 at any time. Therefore, the authentication software 54 may be installed in an application environment in the secure area 62 such that it may obtain the authentication table without passing through an unsecured part of the device.

The secure area 62 may further comprise other applications and/or memory locations. For example, another memory location 58 may store a log file of all actions performed by the BIOS 44 in the secure area 62, or a log file storing any other actions by any other application or all network data exchange, for example all data exchanges over the Internet.

Further, the digital signing algorithm is preferably stored in a secure part of the BIOS 44. This algorithm may be protected like the authentication table in the secure storage location 60, because if both become known to a user, the user may be able to forge a digital signature. By locking the authentication table and the authentication software 54 including the digital signing algorithm in the secure area 62 they are secured.

Figure 4:
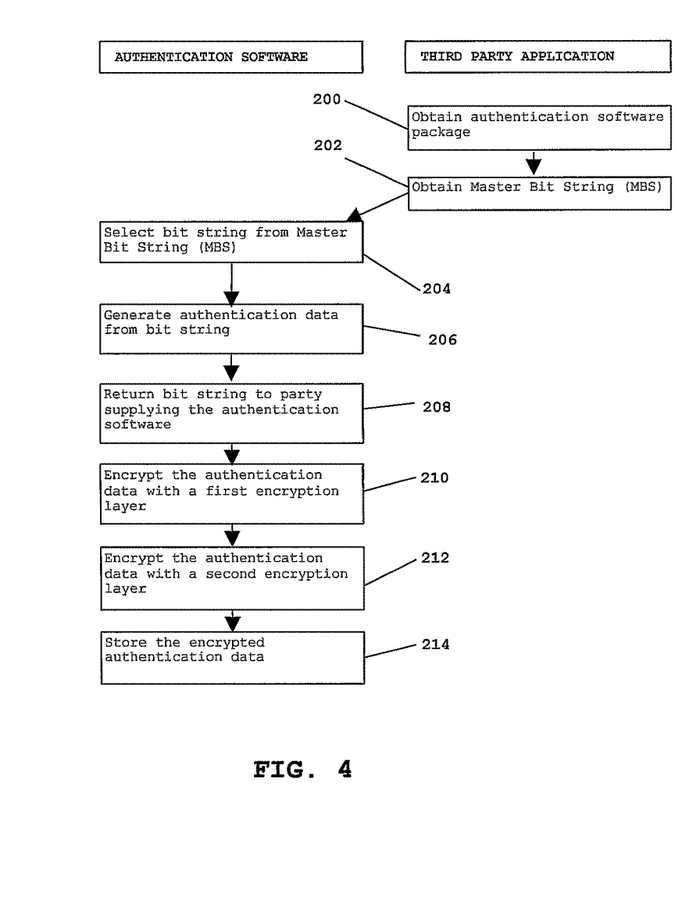
FIG. 4 illustrates a chart of another installation method for an existing device according to the present invention.

In a third preferred installation method illustrated in FIG. 4, the authentication data, e.g. authentication table, is stored in a memory that is accessible to an operating system of the device and possibly to a user of said device. To prevent that the user may obtain the authentication data, which should be prevented as described above, the authentication data are encrypted. Thus, the user may only obtain encrypted authentication data. To prevent that the authentication data becomes accessible to a user, the authentication data should only be decrypted in a secure processing environment such as a 'Ring Zero' processing environment, which is embedded in a processing unit of commonly used personal computers. Such a secure processing environment may only be accessible to selected software applications, preferably not to user-operated software applications. Further, a decryption algorithm and/or a decryption key should not be obtainable to any user.

It is preferred to encrypt the authentication data twice, i.e. using at least two encryption layers. If a malicious user succeeds in decrypting the authentication data once, thus succeeds in decrypting a first encryption layer, a second encryption layer still protects the authentication data.

Preferably, a first encryption layer uses an encryption algorithm employing a device specific encryption key, for example an encryption key associated with part numbers of one or more parts of the device. A second encryption algorithm employs preferably an encryption layer associated with supplied data, such as a supplied bit string or a supplied encryption algorithm. Therefore, the third preferred embodiment is especially suitable for use with an electronic device previously provided with an encryption system for encrypting data using a device specific encryption key. Such devices are known in the art and are commonly and commercially available. In FIG. 4, the third preferred embodiment is illustrated in relation to such a device.

FIG. 4 shows two actors in the installation method. A first actor is a third party application. The third party application may be an application for performing an electronic transaction that needs authentication data, and if no authentication data are found on the device, initiates an installation of the authentication software. Also, it may be an application or an operating system controlled by a user to initiate an installation of the authentication software. The second actor in the installation method is the authentication software. The method may be extended with a third actor. For example, the BIOS may be enabled to encrypt data using a device specific encryption key. In such a case, the BIOS may generate an encryption layer according to cell 210 or 212, as will be described hereinafter.

Now referring to FIG. 4, the third preferred installation method according to the present invention starts with obtaining and installing an authentication software package, for example obtained through the Internet, as indicated in cell 200.

After installation of the authentication software, the authentication software obtains a master bit string (MBS) according to cell 202. The master bit string (MBS) may be a large array of characters, for example 2048 numbers. The MBS may be embedded in the authentication software package, and may in that case not need to be obtained separately as indicated in FIG. 4.

From said master bit string (MBS), according to cell 204, the authentication software selects a bit string. Said bit string thus comprises a number of said characters, for example 128 characters randomly selected from the MBS.

The authentication software generates authentication data, e.g. an authentication table, from the bit string in accordance with cell 206. The authentication software runs in the above-mentioned secure processing environment. Thus, the algorithm generating the authentication data from the bit string is protected against malicious users who want to obtain the authentication data or said algorithm.

The authentication data are generated from a bit string that is generated at the device of the first transaction party and the bit string and is therefore not known to a second transaction party or a trusted third party (TTP). Thus, the second transaction party cannot generate and store (a copy of) the authentication data. For identification of the first transaction party in a transaction, the authentication data need to be known to the second transaction party or a TTP. Therefore, if the authentication data are to be used for identification in a transaction, a copy of the bit string is returned to the supplier of the authentication software package or to another party, which party may be a second transaction party or a TTP in accordance with cell 208.

The bit string may be encrypted or not, while it is returned to the other party. If it is ensured that the algorithm for generating the authentication data from said bit string is not known to any user, the actual bit string used for generating the authentication data may become known to any user.

The generated authentication data may be stored in a user accessible memory, such as a hard drive of a computer device, or on a removable memory such as a floppy disk or a flash memory. As mentioned above, the authentication data need to be protected from any user, especially from a malicious user. Thereto, the authentication data are encrypted by the authentication software, preferably running in a secure processing environment, before the authentication data are stored in said user accessible memory.

According to cell 210, the authentication data are encrypted by a first encryption layer, e.g. by an encryption algorithm which is part of the authentication software package. The algorithm is secured such that it does not become known to any user. According to cell 212, the authentication data are further encrypted by a second encryption layer, e.g. using an encryption key which is associated with a hardware device serial number, or the like, thereby preventing illegal copying to another device. If the authentication data are stored in a removable memory, for example a flash memory, the encryption key may be associated with a serial number of the removable memory. Preferably, the encryption key is (also) associated with a user identifying number, e.g. a personal identifying number (PIN) or a number or a template associated with a fingerprint of the user, or the like.

According to cell 214, the encrypted authentication data are stored in the memory. Thus, the device is provided with the authentication software and the authentication data, the authentication data being secured by encryption from becoming known to a user. The device is installed for performing the transaction method and the legitimate use verification method according to the present invention.

Figure 5A:
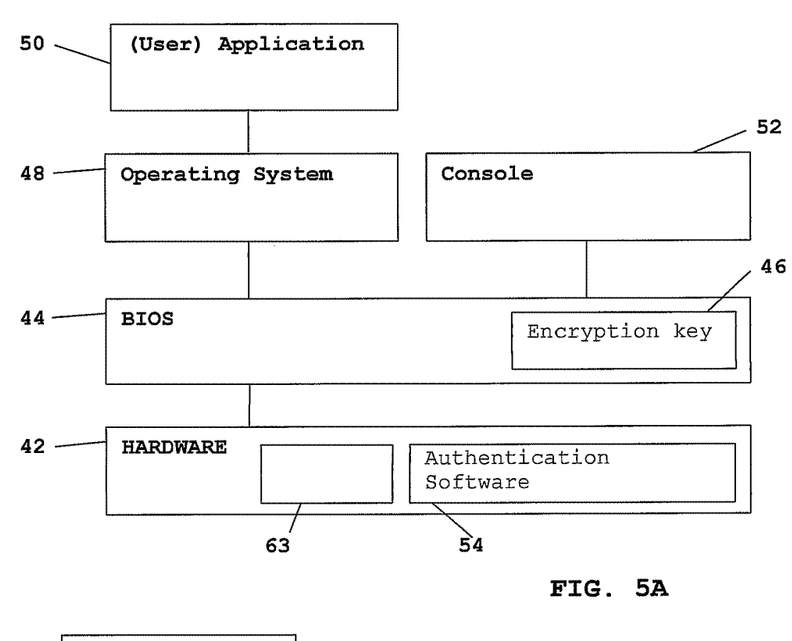
FIG. 5A schematically illustrates a computer configuration having authentication software and an authentication table installed in a user accessible memory.

FIG. 5A illustrates schematically an embodiment of an electronic device for performing the installation method according to the third embodiment of the present invention. The schematic diagram of FIG. 5A is similar to the diagram of FIG. 3. The illustrated electronic device comprises hardware 42, a BIOS 44, an operating system 48, a user application 50, and a console 52. From the below description, it will become apparent to those skilled in the art that the secure area 62 (as indicated in FIG. 3) is not essential for performing the third embodiment of the installation method according to the present invention.

After installation of the authentication software package according to the method illustrated in FIG. 4, an encrypted data package is stored in a memory location 63 that is a part of the hardware 42. The memory location 64 is accessible to a user via a user application 50. The application 50 may request data from the memory location 63 by sending a request to the operating system 48. The operating system 48 may obtain the data stored at the memory location 63 possibly via the BIOS 44. The authentication software is also installed and stored in a user accessible memory location as indicated. The authentication software may be encrypted, or not.

Figure 5B:
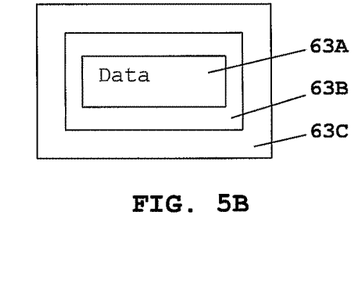
FIG. 5B schematically illustrates a memory location secured by two encryption layers.

The data stored at the memory location 63 are encrypted authentication data. The encryption of the authentication data renders the data unusable to the user application 50. FIG. 5B illustrates the encryption of authentication data 63A stored in memory location 63. The authentication data 63A are encrypted twice as illustrated in FIG. 4. A first encryption layer 63B and a second encryption layer 63C protect the authentication data 63A. Said encryption layers 63B and 63C may be removed by decryption by the corresponding application.

One encryption layer may be decrypted by the authentication software 54. The other encryption layer may be an encryption/decryption application stored in the electronic device using a device specific encryption key. Such an application may be stored in the BIOS or in a secure area 58 (as indicated in FIG. 3) and may use the encryption key 46. In other embodiments, there may be only one encryption layer or any other encryption/decryption application may be employed.

Figure 6:
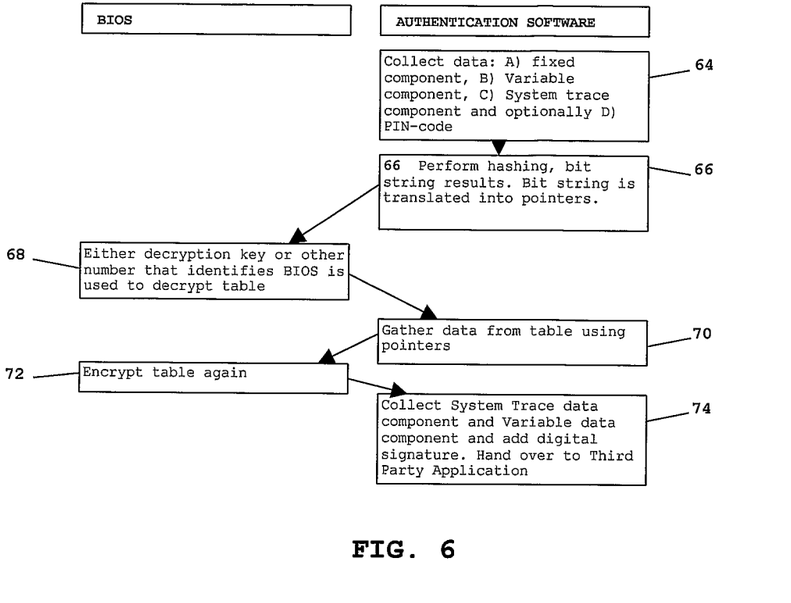
FIG. 6 illustrates a chart of a method to generate a digital signature from a random table.

Referring to FIG. 5A again, the application 50 may require a digital signature for an electronic transaction or for verification of legitimate use of digital data. Thereto, the authentication software 54 is executed to initiate decryption of the authentication data stored in memory location 63 and for generating said digital signature. From one authentication table, numerous digital signs may be generated. FIG. 6 illustrates a method to generate a certain digital signature from an authentication table and illustrates how numerous different digital signs may be generated. Using different digital signs for every action minimizes the chance of infringements or forgery and maximizes the ability to trace the origin of an illegal copy.

FIG. 6 shows two actors, a BIOS and the authentication software. The authentication software starts by collecting data according to cell 64. There are multiple components required. First a fixed component, which is identical for each instance a digital signature is generated. Further, a variable component is used, which enables the method to generate a numerous amount of different, but traceable digital signs. A system trace component, e.g. a transaction ID, also depends on the instance. Two variable components make it virtually impossible to derive the authentication table from a number of generated digital signs. Optionally, a personal identification number (PIN) or password may be used to identify the user as well as the device in which the authentication software is embedded.

When all the required data is collected, the authentication software hashes the collected data into a bit string and translates the bit string into a number of pointers according to cell 66. Using the encryption key, the authentication table is decrypted by the BIOS according to cell 68. The pointers generated according to cell 66 point to positions in the authentication table. Using the pointers, the authentication software gathers a series of random numbers from the authentication table according to cell 70. Thereafter, according to cell 72, the BIOS encrypts the authentication table again. Finally, the digital signature accompanied by the variable data components that were used to generate the digital signature are transferred to the requesting application according to cell 74.

A digital signature generated according to the present invention may be used in various ways. First, it may be used to track and trace digital files. Second, it may be used off-line to prevent illegally copied software from being used and third, the digital signature may be used in on-line transactions and authentication, for example network access authentication.

Figure 7:
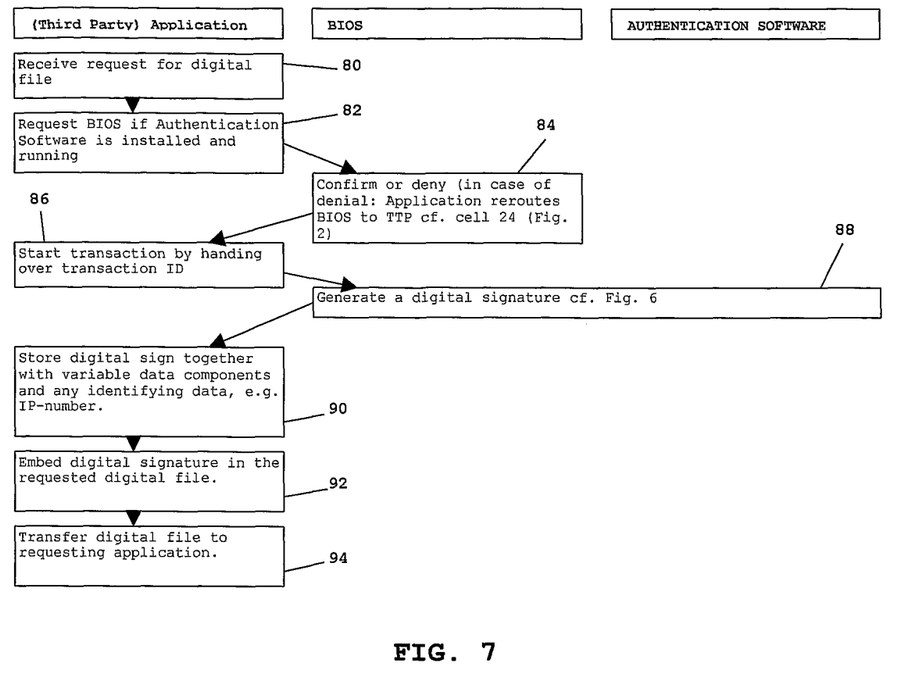
FIG. 7 illustrates a chart of a method to generate a personalized traceable digital file according to the present invention.

FIG. 7 illustrates the track and trace method for digital files. Information contained in a digital file may be protected by copyrights, for example. Software, films or music may be bought and downloaded from the Internet. However, such digital files containing protected information may be very easily illegally copied and spread without a trace of whom copied and spread the file. Adding a trace in the digital file makes it possible to trace to origin of the illegal copy. Rightful owners of such a digital file, e.g. music file, will therefore not spread the file, but they may use the file on different locations, for instance on their computer at home and on their portable digital player, e.g. MP3-player.

According to cell 80, a third party application receives a request for a digital file, e.g. software or a music file. The third party application is intended to provide protected or traceable digital files and may be any application adapted therefor. It may be an on-line application, for example.

Then, according to cell 82, the third party application asks the requesting device if the authentication software is installed and running. According to cell 84, the BIOS responds. If the authentication software is not installed or running, the device is rerouted to a trusted third party to download and install the software according to cell 24 of FIG. 2.

If the software is installed and running, the third party application starts the transaction by transferring a transaction ID to the requesting device's BIOS according to cell 86. According to cell 88, the BIOS and authentication software generate a digital signature in accordance with the method described in relation to FIG. 6 using the transaction ID they received.

The generated digital signature together with the variable data component, e.g. date/time, is then sent to the third party application. According to cell 90, the third party application stores the digital signature, the variable data component, transaction ID, which it provided itself, and some data that identifies the requesting device, e.g. an IP-number, Ethernet number, serial number or any other unique identifying number, in a database.

Further, the digital signature is embedded in the requested digital file according to cell 92. This does not necessarily need to be conducted after the storage according to cell 90, but may also be done before or at the same time.

The digital signature is preferably unique for the requested digital file. When an illegal copy of the digital file is found, the third party application will be able to check in its database to which device it sent that particular file after reading the digital signature embedded in the file.

The file with the digital signature embedded therein is sent to the requesting device according to cell 94, which completes the method.

In a further embodiment, the authentication software may be provided with a system for signing a digital signature according to the present invention using at least a part of a software identification number (software ID) or any other application identifying character string, hereinafter referred to as a private key. The private key is registered at a third party, for example the authentication software provider which supplied said private key. The private key may be used to uniquely sign the digital signature and append the signed digital signature to the digital signature, which is sent to the second transaction party. The second transaction party is not capable of generating the signed digital signature without the private key. The second transaction party only stores the signed digital signature.

The first transaction party may later claim not to have performed the transaction and not to have generated the digital signature, and may thus claim that another party has maliciously presented itself as the first transaction party while being able to generate a corresponding digital signature. The second transaction party may then verify the signed digital signature by sending it to the third party, which may verify the signed digital signature. Based on the signed digital signature it may be determined whether a malicious user has performed the transaction or the first transaction party is maliciously claiming not to have performed the transaction.

Figure 8:
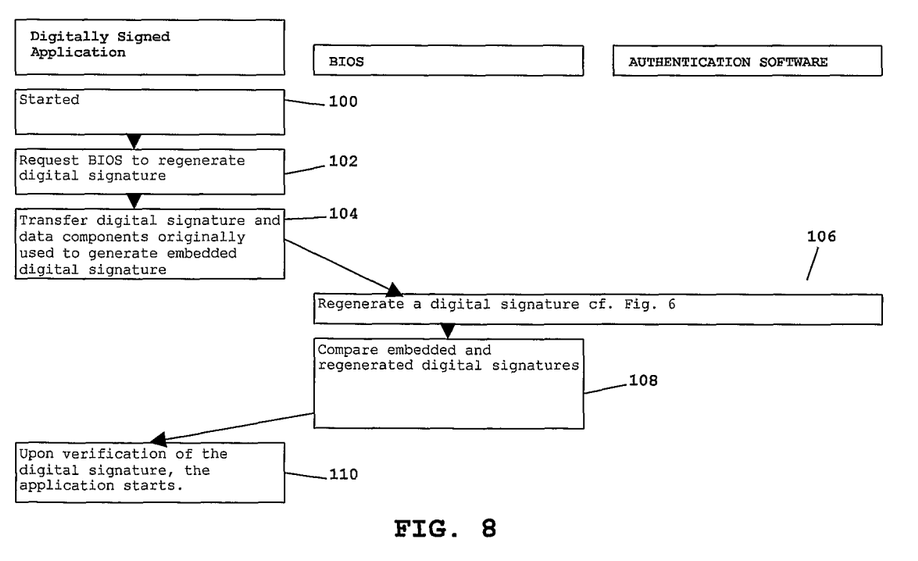
FIG. 8 illustrates a chart of an off-line authentication of digital rights according to the present invention.

FIG. 8 illustrates a method to protect digital files from being used on other devices than the originally intended device. For illustrative purposes, an application that is digitally signed according to the present invention is described in relation to FIG. 6. However, the method may also be used for any other signed digital file such as a file containing music or video.

According to cell 100, an application having a digital signature embedded therein is being started on a device having the authentication software installed in its BIOS. The embedded digital signature has been generated on said device and is therefore device specific. For example, the application may have been obtained using the method discussed in relation to FIG. 7. In any case, the application has been signed and programmed to be used on the specific device having the authentication software installed.

The application is programmed to start with a verification of its embedded digital signature. Therefor, the application requests the BIOS to verify its digital signature according to cell 102. For the BIOS to be able to verify the digital signature, it needs the data components that were used to generate the digital signature. So, according to cell 104, the application transfers the data components to the BIOS. After receipt of all necessary data from the application, the BIOS regenerates the digital signature according to cell 106.

For verification, it is needed to compare the embedded digital signature with the regenerated digital signature. This comparison may be conducted by the authentication software in the BIOS or the BIOS. Thus, according to cell 108, the BIOS receives and compares the embedded digital signature with the regenerated digital signature.

If the two digital signs are identical, the application starts according to cell 110, otherwise the BIOS prevents the application being started, possibly informing the user that it is trying to use an illegal copy of the application.

Figure 9:
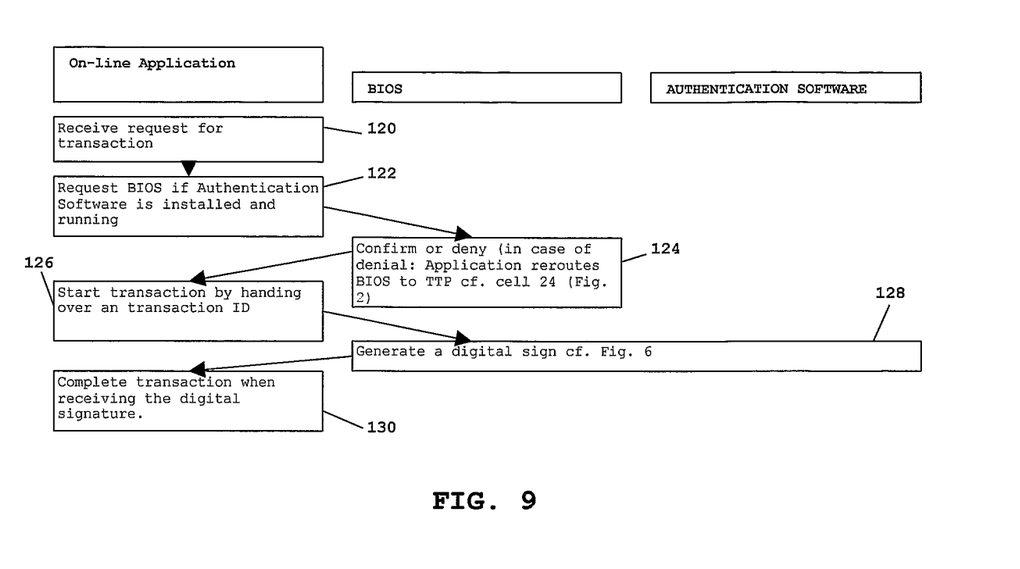
FIG. 9 illustrates a chart of an on-line authentication or transaction method according to the present invention.

FIG. 9 illustrates an on-line transaction method. An on-line application is accessed with a request for a transaction, possibly a financial transaction. For example, the transaction may be a customer who wishes to purchase an item on-line. Usually, such transactions are performed using a credit card. However, only a credit card number and some additional data are supplied by the customer. If a customer later states he did not purchase or use his credit card, there is no way of verifying by checking a signature, like in common credit card transactions.

Referring to FIG. 9, according to cell 120, the on-line application receives a request for a transaction. Upon this request, the on-line application asks the BIOS of the requesting device if the authentication software according to the present invention is installed and running. If not, the requesting device is rerouted to a TTP to download and install the authentication software and authentication table according to the method discussed in relation to FIG. 2 or FIG. 4.

If the authentication software is installed and running, the BIOS responds accordingly according to cell 124 and the on-line application hands over a transaction ID according to cell 126. The requesting device may then generate a digital signature according to the method described in relation to FIG. 6, according to cell 128. The variable data components used for generating the digital signature and the digital signature itself are then transferred to the on-line application, which may then complete the transaction according to cell 130.

The digital signature functions as a signature in this case. If the customer later claims not to have used its credit card, for example, the on-line application owner may verify the digital signature. The verification of the digital signature may be conducted by the trusted third party, which supplied the authentication table to the customer and is able to regenerate said authentication table. It may also be conducted by using the customer device regenerating a digital signature using the variable data components stored by the on-line application.

Optionally, a certain on-line third party application may use an authentication table in transactions with a specific device, which authentication table is specifically intended for use in transactions with said certain on-line third party application. Such a specific authentication table has the advantage that the third party application may verify the digital signature already before completing the transactions and so preventing that problems may later arise.

The specific authentication table may be derived from the authentication table stored in the BIOS of said device using an algorithm known to the device. The specific authentication table derived from the original authentication table would then be supplied by the TTP to the on-line application. Thus, the device knows how to derive the specific authentication table and the on-line third party application knows a certain table, but not the original table stored in the BIOS of the device. Otherwise, the on-line third party may provide a separate authentication table to the requesting device. The specific authentication table is encrypted before it is stored using a BIOS specific encryption key. This ensures that the supplying third party does not know the stored authentication data and therefore the third party can not use the data in a fraudulent way.

If the on-line application knows the authentication table used by the requesting device to generate a digital signature, the requesting device may be a device connecting to a network, e.g. a corporate private network. The requesting device needs to be identified by the corporate network before access to the corporate network is granted. Upon connection, the requesting device sends a digital signature that was generated using fixed data components and variable data components. The fixed data components may comprise a password or a personal identification number (PIN). The fixed data components are known to the corporate network and do not need be sent over the unsecured network connection; only the variable data components used are sent over the unsecured connection. Thus, the corporate network may regenerate the digital signature of the connecting device after receipt of the used variable data components. This method has the advantage that no password or PIN is sent over an unsecured connection and that the digital signature identifies both the device (authentication table) and the user (PIN or password).

Apart from securing a transaction or network authentication as illustrated above, also the hardware used in the operating environment may be verified. For example, if a first computer communicates with a second computer, the second computer may identify itself in a similar way, using similar data, as used in a transaction, described above. If the authentication table of the second computer is known at the first computer, the identification of the second computer may be verified by the first computer. A similar procedure is feasible when one of the computers communicates with a printer, as long as the authentication tables are stored securely in the devices.

Figure 10:
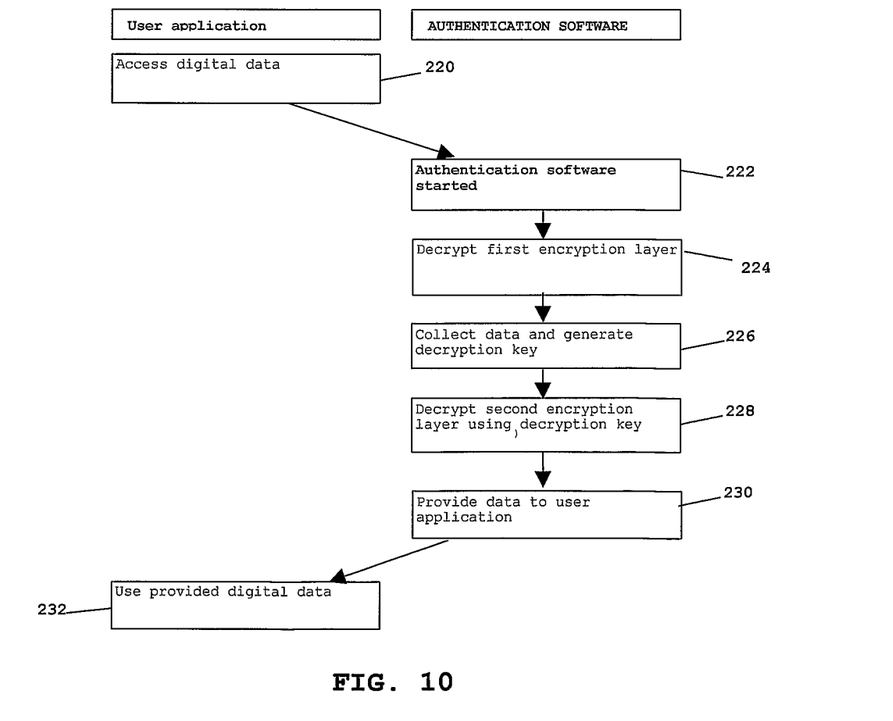
FIG. 10 illustrates a chart of an off-line authentication of digital rights of digital data stored in a removable memory according to the present invention.

FIG. 10 illustrates a method for authenticating a user to access digital data that are stored in a removable and portable memory such as a flash memory. Digital data may be stored in the removable memory using the encryption method for protecting (authentication) data as illustrated in and described in relation to FIG. 4, i.e. data are encrypted using at least one, preferably at least two encryption layers, of which one layer is related to the authentication software installed according to FIG. 4. The removable memory is to be connected with an electronic device on which the authentication software has been installed according to said method illustrated in FIG. 4 in order to decrypt the encryption layer related to said authentication software.

Referring to FIG. 10, digital data are stored in a removable and portable memory. The digital data are encrypted on another electronic device, for example a computer device at work, while the electronic device attempting to access the digital data is a computer device at home.

The authentication software for accessing the digital data is installed on both computer devices, e.g. at home and at work, according to the installation method of FIG. 4. The digital data are to be read by a user application such as a text editor, a spreadsheet application, an audio or video application, or the like. In another case, the digital data may be a software application to be executed by the electronic device.

After connecting the portable and removable memory with the electronic device, a user starts the user application. From the user application, an attempt is made to access the digital data according to cell 220. The digital data are however encrypted.

Then, according to cell 222, the authentication software is started to decrypt the digital data. The digital data are transferred to the authentication software. In accordance with cell 224, the authentication software decrypts a first encryption layer using a decryption algorithm, for example embedded in the authentication software. Said decryption algorithm is identical on each device that is provided with the authentication software.

To prevent that any device being provided with the authentication software may decrypt the digital data, the digital data may be protected with a second encryption layer. For decryption of the second encryption layer, a decryption key is required. Such a decryption key may be associated with a serial number of the portable memory, ensuring that the digital data are only decryptable if the digital data are stored in said portable memory. A copy of the digital data in any other memory is thereby rendered undecryptable. Likewise, the decryption key may be associated with a personal identification number (PIN) rendering the digital data unusable without the PIN. In yet another embodiment, the decryption key may be associated with a fingerprint of a user, rendering the digital data unusable without the presence of that specific user.

The decryption key may be associated with any identifying characteristic such as a serial number, a PIN or a fingerprint by a protected hashing algorithm or it may be identical to the serial number or PIN. Hashing the characteristic provides however an additional security layer, especially when the hashing is performed in the secure processing environment.

According to cell 226, the data for generating the decryption key are collected and the decryption key is generated. Then, in accordance with cell 228, the second encryption layer is decrypted. The digital data are now suitable for access by the user application. Therefore, in cell 230, the digital data are provided to the user application and in cell 232, the user application accesses and uses the digital data. After use and possibly alteration of the digital data, the digital data are again stored in the removable memory using the encryption algorithm of the authentication software and using the decryption key used to access the digital data.

Above it is described that the decryption algorithm is identical on each device that is provided with the authentication software. However, the decryption/encryption algorithm may also be different for each device or it may be identical for each device that is installed using an authentication software package obtained by a specific user. Thus, the digital data may only be accessible on a device that is previously installed by said specific user.

In such a case, it is necessary to provide certain authentication data to the transaction party supplying said authentication software, since the user specific algorithm needs to be embedded in the software package before the software package is supplied to the specific user in order to protect the algorithm.

In an even further embodiment, digital data may be encrypted using an encryption key that is generated according to the present invention, i.e. identical to the method for generating a digital signature. FIG. 6 illustrates how a digital signature may be generated according to the present invention by gathering session specific data, such as fixed data, variable data, personal data and/or device specific data. Hashing said session specific data may generate reference numbers, referring to positions in the authorization table securely stored according to the present invention. Gathering the characters stored in the authorization table at said positions generates a bit string comprising a number of characters. Said bit string may comprise any number of characters and said number may be dependent on the session specific data. Data encrypted with an encryption key having an unknown number of bits is virtually impossible to be cracked by another person not entitled to access said data.

To decrypt the data, the encryption key is required. To obtain the encryption key, the authorization table and the session specific data are needed. Having an authorization table stored and installed in a device according to the present invention, data may be securely stored in a memory of said device. The data may easily be decrypted when being accessed using said device. However, a copy of said encrypted data on any other device is rendered virtually inaccessible.

If identical authorization tables are stored on two or more separate devices, encrypted data may be exchanged between said two or more devices. If the encrypted data are transferred from one device to another, together with the session specific data, the other device may regenerate the encryption key and decrypt the data. Such an encryption and decryption method is especially useful for secure communication between said two or more devices over a publicly accessible network such as the Internet.

In an embodiment, a network server is provided with all authorization tables of client devices connected to said server. A client attempting to access the server and the network of said server is authenticated by its digital signature, and thereafter all exchanged data may be encrypted using a digital signature. If a client sends data to another client, the data may be encrypted and transferred to the server together with the session specific data. The server decrypts the data using the session specific data and the authorization table of the first client. Then, the server encrypts the data again, now using the authorization table of the other client using the same or other session specific data. Next, the encrypted data are transferred to the other client together with the corresponding session specific data, which decrypts the data using its authorization table.

Now referring to FIG. 10 again, the digital data securely stored on the portable and removable memory device may be an authorization table according to the present invention. Thus, digital data encrypted using the authorization table may be decrypted on any device when the portable and removable memory device is connected to said device and said device is provided with the authorization software according to FIG. 10.

The invention claimed is:

1. A method for performing an electronic transaction between a first transaction party and a second transaction party using an electronic device operated by the first transaction party, the electronic device having an operating system creating a run-time environment for user applications, the method comprising:
   providing a private key in a memory of said electronic device, said memory being a secure part of a Basic In Out System or any other secure location in said electronic device, which private key is inaccessible to a user of said electronic device, wherein the private key is encrypted when the private key is stored in said memory, a decryption key for decrypting the private key being incorporated in the electronic device, said decryption key being inaccessible to said user, to any user-operated software and to said operating system, wherein said memory is inaccessible to said operating system of said electronic device, thereby rendering the private key inaccessible to said user, wherein the private key is decrypted in a secure processing environment inaccessible to said user and to any user-operated software;
   providing authentication software in said electronic device, the private key being accessible to said authentication software, wherein authentication software is stored in said secure memory inaccessible to said operating system;
   activating the authentication software to generate a digital signature from the private key, wherein the authentication software is run in a secure processing environment inaccessible to said operating system;
   providing the digital signature to the second transaction party.

2. The method according to claim 1, wherein the private key is provided by the second transaction party, which stores the private key together with data identifying the first transaction party.

3. The method according to claim 1, wherein the authentication software has its own unique serial number, software ID or encryption key.

4. The method according to claim 1, wherein the private key is encrypted by the second transaction party using an encryption key before the private key is provided to the first transaction party.

5. The method according to claim 4, wherein the authentication software retrieves a decryption key associated with the encryption key and decrypts the private key at its first use.

6. The method according to claim 1, wherein the authentication software is installed in an application environment in the secure area such that it may obtain the private key without passing through an unsecured part of said electronic device.

7. The method according to claim 1, wherein the private key is encrypted using at least two encryption layers.

8. The method according to claim 1, wherein the private key is encrypted using an encryption key which is associated with a hardware device serial number.

9. The method according to claim 1, wherein the private key is encrypted using an encryption key which is associated with a user identifying number, in particular a personal identifying number, PIN, or a number or a template associated with a fingerprint of the user.

10. The method according to claim 1, wherein the decryption key is associated with one or more serial numbers of hardware components of said electronic device.

11. The method according to claim 1, wherein the private key is decrypted by the authentication software.

12. The method according to claim 1, wherein the private key is decrypted by an application stored in the electronic device using a device specific encryption key.

13. The method according to claim 1, wherein the private key is decrypted using a decryption key associated with any identifying characteristic, in particular a serial number, a personal identification number, PIN, or a fingerprint of a user.

14. The method according to claim 1, further comprising identifying the user of the electronic device before activating the authentication software.

15. The method according to claim 1, wherein the authentication software has an encryption key for encrypting digital data.

16. An electronic device comprising
a network interface configured for an electronic transaction between a first transaction party, and a second transaction party, wherein the electronic device is operated by the first transaction party;
a processor configured for an operating system creating a run-time environment for user applications;
a memory storing a private key, said memory being a secure part of a Basic In Out System or any other secure location in said electronic device, which private key is inaccessible to a user of the electronic device, wherein the private key is encrypted when the private key is stored in said memory, a decryption key for decrypting the private key being incorporated in the electronic device, said decryption key being inaccessible to said user, to any user-operated software and to said operating system, wherein said memory is inaccessible to said operating system of said electronic device, thereby rendering the private key inaccessible to said user, wherein the private key is decrypted in a secure processing environment inaccessible to said user and to any user-operated software; and
a memory storing authentication software, the private key being accessible to said authentication software, wherein the authentication software is stored in a secure memory location inaccessible to said operating system;
wherein the processor is configured for activating the authentication software to generate a digital signature from the private key, wherein the authentication software is run in a secure processing environment inaccessible to said operating system, for providing the digital signature to the second transaction party.

17. Method for performing an electronic transaction between a first transaction party and a second transaction party using an electronic device operated by the first transaction party, the electronic device having an operating system creating a run-time environment for user applications, the method comprising:
providing a private key in a memory of said electronic device, wherein the private key is encrypted, when the private key is stored in said memory, a decryption key for decrypting the private key being incorporated in the electronic device, said decryption key being inaccessible to said user, to any user-operated software, and to said operating system, wherein the private key is decrypted in a secure processing environment inaccessible to said user and to any user-operated software;
providing authentication software in said electronic device, the private key being accessible to said authentication software;
activating the authentication software to generate a digital signature from the private key, wherein the authentication software is run in a secure processing environment inaccessible to said operating system;
providing the digital signature to the second transaction party.

18. An electronic device comprising:
a network interface configured for an electronic transaction between a first transaction party, and a second transaction party, wherein the electronic device is operated by the first transaction party;
a processor configured for an operating system creating a run-time environment for user applications;
a memory storing a private key, wherein the private key is encrypted, when the private key is stored in said memory, a decryption key for decrypting the private key being incorporated in the electronic device, said decryption key being inaccessible to said user, to any user-operated software, and to said operating system, wherein the private key is decrypted in a secure processing environment inaccessible to said user and to any user-operated software; and
a memory storing authentication software, the private key being accessible to said authentication software;
wherein the processor is configured for activating the authentication software to generate a digital signature from the private key, wherein the authentication software is run in a secure processing environment inaccessible to said operating system, for providing the digital signature to the second transaction party.

19. The electronic device according to claim 18, wherein the electronic device is a personal computer, a cellular phone, a hand-held personal digital assistant with wireless communication capabilities, or a device containing a BIOS.

* * * * *

(12) POST-GRANT REVIEW CERTIFICATE (300th)

United States Patent
Ward et al.

(10) Number: US 10,992,480 J1
(45) Certificate Issued: Jul. 25, 2025

(54) METHOD AND SYSTEM FOR PERFORMING A TRANSACTION AND FOR PERFORMING A VERIFICATION OF LEGITIMATE ACCESS TO, OR USE OF DIGITAL DATA

(71) Applicant: WARD PARTICIPATIONS B.V.

(72) Inventors: Scott MacDonald Ward; Teunis Tel

(73) Assignee: WARD PARTICIPATIONS B.V.

Trial Number:

PGR2022-00007 filed Oct. 29, 2021

Post-Grant Review Certificate for:

Patent No.: 10,992,480
Issued: Apr. 27, 2021
Appl. No.: 16/597,773
Filed: Oct. 9, 2019

The results of PGR2022-00007 are reflected in this post-grant review certificate under 35 U.S.C. 328(b).

POST-GRANT REVIEW CERTIFICATE
U.S. Patent 10,992,480 J1
Trial No. PGR2022-00007
Certificate Issued Jul. 25, 2025

AS A RESULT OF THE POST-GRANT REVIEW PROCEEDING, IT HAS BEEN DETERMINED THAT:

Claims 1-19 are cancelled.

\* \* \* \* \*

(12) INTER PARTES REVIEW CERTIFICATE (4074th)

United States Patent  
Ward et al.

(10) Number: US 10,992,480 K1
(45) Certificate Issued: Jul. 25, 2025

(54) METHOD AND SYSTEM FOR PERFORMING A TRANSACTION AND FOR PERFORMING A VERIFICATION OF LEGITIMATE ACCESS TO, OR USE OF DIGITAL DATA

(71) Applicant: WARD PARTICIPATIONS B.V.

(72) Inventors: Scott MacDonald Ward; Teunis Tel

(73) Assignee: WARD PARTICIPATIONS B.V.

Trial Numbers:

IPR2022-00113 filed Oct. 29, 2021
IPR2022-01076 filed May 25, 2022

Inter Partes Review Certificate for:

Patent No.: 10,992,480
Issued: Apr. 27, 2021
Appl. No.: 16/597,773
Filed: Oct. 9, 2019

The results of IPR2022-00113 joined with IPR2022-01076 are reflected in this inter partes review certificate under 35 U.S.C. 318(b).

INTER PARTES REVIEW CERTIFICATE
U.S. Patent 10,992,480 K1
Trial No. IPR2022-00113
Certificate Issued Jul. 25, 2025

AS A RESULT OF THE INTER PARTES REVIEW PROCEEDING, IT HAS BEEN DETERMINED THAT:

Claims 1, 3 and 6-19 are cancelled.

\* \* \* \* \*